(12) United States Patent
Oktem et al.

(10) Patent No.: US 11,145,299 B2
(45) Date of Patent: Oct. 12, 2021

(54) MANAGING VOICE INTERFACE DEVICES

(71) Applicant: X Development LLC, Mountain View, CA (US)

(72) Inventors: Meltem Oktem, Toronto (CA); Max Benjamin Braun, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/957,070

(22) Filed: Apr. 19, 2018

(65) Prior Publication Data
US 2019/0325865 A1 Oct. 24, 2019

(51) Int. Cl.
*G10L 15/00* (2013.01)
*G10L 15/20* (2006.01)
(Continued)

(52) U.S. Cl.
CPC ............ *G10L 15/22* (2013.01); *G10L 13/00*
(2013.01); *G10L 15/26* (2013.01); *G10L 15/30*
(2013.01); *G10L 25/51* (2013.01); *G10L 25/84*
(2013.01)

(58) Field of Classification Search
CPC ... G10L 15/22; G10L 2015/223; G10L 15/30; G10L 2015/088; G10L 17/22; G10L 15/26; G10L 15/32; G10L 15/265; G10L 15/00; G10L 15/24; G10L 25/51; G10L 17/00; G06F 3/167; G06F 17/2765;
(Continued)

(56) References Cited

U.S. PATENT DOCUMENTS 6,052,666 A 4/2000 Diehl et al.
6,584,439 B1 6/2003 Geihufe et al.
(Continued)

FOREIGN PATENT DOCUMENTS

EP 1426924 12/2002
WO WO2013133533 9/2013
WO WO 2015/111845 7/2015

OTHER PUBLICATIONS

J. Valin, S. Yamamoto, J. Rouat, F. Michaud, K. Nakadai and H. G. Okuno, "Robust Recognition of Simultaneous Speech by a Mobile Robot," in IEEE Transactions on Robotics, vol. 23, No. 4, pp. 742-752, Aug. 2007, doi: 10.1109/TRO.2007.900612. (Year: 2007).*
(Continued)

*Primary Examiner* — Michael Ortiz-Sanchez
(74) *Attorney, Agent, or Firm* — Fish & Richardson P.C.

(57) ABSTRACT

Methods, systems, and apparatus, including computer-readable storage devices, for managing voice interface devices. In some implementations, messages are received from a plurality of devices, each of the messages indicating a respective voice input detected by the device that sent the message. Audio signatures are obtained for the voice inputs detected by the plurality of devices. The audio signatures for the voice inputs and times that the voice inputs were detected are evaluated. Based on the evaluation, at least some of the plurality of devices are grouped to form a group of multiple devices that detected a same user utterance. A device from the group is selected to respond to the user utterance, and the multiple devices in the group are managed so that only the selected device outputs a synthesized speech response to the user utterance.

19 Claims, 4 Drawing Sheets

(51) Int. Cl.
*G10L 15/22* (2006.01)
*G10L 25/51* (2013.01)
*G10L 15/26* (2006.01)
*G10L 25/84* (2013.01)
*G10L 15/30* (2013.01)
*G10L 13/00* (2006.01)

(58) Field of Classification Search
CPC .............. G06F 17/2785; G06F 1/3231; G06F 2221/2111; G06F 16/245; G06F 2203/0381; G06F 16/2425; G06F 16/63
See application file for complete search history.

(56) References Cited

U.S. PATENT DOCUMENTS

| | | | |
|---|---|---|---|
| 9,472,205 B2 | 10/2016 | Kolavennu et al. | |
| 9,811,315 B1* | 11/2017 | Li | G06F 3/0487 |
| 9,812,128 B2 | 11/2017 | Mixter et al. | |
| 9,854,032 B2 | 12/2017 | Liu et al. | |
| 10,374,816 B1* | 8/2019 | Leblang | G10L 15/22 |
| 10,616,726 B1* | 4/2020 | Freeman, II | G06F 3/167 |
| 2002/0035477 A1 | 3/2002 | Schroder et al. | |
| 2011/0010170 A1 | 1/2011 | Burns et al. | |
| 2012/0034904 A1 | 2/2012 | Lebeau et al. | |
| 2013/0133533 A1 | 5/2013 | Sugasaki | |
| 2014/0136195 A1 | 5/2014 | Abdossalami et al. | |
| 2014/0274203 A1 | 9/2014 | Ganong, III et al. | |
| 2015/0111845 A1 | 4/2015 | Fernandes | |
| 2015/0194155 A1 | 7/2015 | Tsujikawa et al. | |
| 2016/0155443 A1* | 6/2016 | Khan | G10L 15/22 |
| | | | 704/275 |
| 2017/0076720 A1 | 3/2017 | Gopalan et al. | |
| 2017/0083285 A1 | 3/2017 | Meyers et al. | |
| 2017/0230446 A1 | 8/2017 | Liu et al. | |
| 2018/0018964 A1* | 1/2018 | Reilly | G10L 15/02 |
| 2018/0096683 A1 | 4/2018 | James | G10L 15/30 |
| 2018/0108352 A1* | 4/2018 | Sumiyoshi | G06F 16/90332 |
| 2018/0234765 A1* | 8/2018 | Torok | H04R 3/12 |
| 2018/0286391 A1* | 10/2018 | Carey | G10L 15/22 |
| 2018/0336892 A1* | 11/2018 | Kim | G10L 15/04 |
| 2019/0005960 A1* | 1/2019 | Naravanekar | G10L 15/30 |
| 2019/0258369 A1* | 8/2019 | Suzuki | G06F 3/011 |
| 2019/0311715 A1* | 10/2019 | Pfeffinger | G06F 3/167 |
| 2020/0020333 A1* | 1/2020 | Amores | B25J 11/0005 |

OTHER PUBLICATIONS

PCT International Search Report and Written Opinion in International Appln. PCT/US2019/028140, dated Jul. 29, 2019, 12 pages.
PCT International Preliminary Report on Patentability in International Appln. No. PCT/US2019/028140, dated Oct. 29, 2020, 7 pages.

* cited by examiner

MANAGING VOICE INTERFACE DEVICES

TECHNICAL FIELD

This disclosure relates generally to managing voice interface devices.

BACKGROUND

Electronic devices can be programmed to respond to voice commands. In some scenarios, multiple devices at a particular location may receive the same voice command or may detect different voice commands roughly the same time. Devices may determine how and when to respond to detected commands.

SUMMARY

In some implementations, a computer system manages devices that provide voice interfaces to direct which device(s) respond to voice commands. The devices may be phones, robots, assistant devices such as smart speakers, entertainment devices, or other devices. In some situations, multiple devices may be near a user when the user speaks a command, so multiple devices detect the same voice command. For example, some environments, such as hotel lobbies, airports, and stores, may include multiple devices to assist visitors. The devices may be located near each other, and a single voice command may be detected by multiple devices. However, it is generally not desirable for multiple devices to respond to a single command, especially if the responses would be redundant or confusing. To address this situation, the computer system can manage the devices so that only one device responds to each voice command, even if the command is detected by several nearby devices.

In busy environments, multiple people may speak commands concurrently or at similar times, with different sets of devices detecting different utterances. In this situation, it is desirable to provide a response to each different user utterance, but still avoid duplicative responses. The computer system can obtain information about the various utterances detected, and then assign specific devices to respond, so that only a single response is provided for each utterance.

To manage voice responses, the computer system may communicate with devices at a location and creates groups of the devices that detected the same user utterance. For example, the computer system can identify a first group of devices that each detected a first voice command from a first person, identify a second group of devices that each detected a second voice command from a second person, and so on. In general, if there are "N" people speaking to devices at a location, the computer system can create "N" distinct groups, where each group includes those devices that detected the utterance from a particular person.

In some cases, a device may be associated with an account (e.g., a user account for the owner of the device). The computer system may use account information to perform the grouping of devices, for example, to form groups of devices from the set of devices associated with the same account. As part of the grouping process, the computer system can compare the timing for the detected utterances, as well as audio signatures generated from the content of the detected audio, to determine which devices detected the same utterance. Once the devices have been assigned to different groups according to which utterance the device detected, the computing system selects a single device within each group to respond to the utterance. The responding device can be selected based on various factors, including: (1) device type (e.g., prefer a robot over a phone), (2) audio signal power (e.g., prefer a device with the highest received audio power since that device is likely closest to the user), and (3) background noise (e.g., prefer devices having lower background noise).

The computer system controls the devices in each group so that only one device in each group responds to each utterance. For example, the computer system can send commands to suppress responses from all devices in a group except the device that was selected to respond. As another example, the computer system can send a command instructing the selected device to respond to the utterance. By grouping devices according to the detected utterance and selecting one device in each group to respond to the utterance, the system ensures that each person that spoke an utterance receives a response from one device.

In some cases, a device that detects an utterance can override the typical grouping and selection process and provide a response to the utterance without waiting for grouping and selection results. For example, a specific device may respond early when the device detects strong evidence of user engagement with the specific device. Examples of strong engagement indications include a user tapping on the screen of a phone or a robot detecting that the user is looking at the robot. When these high-confidence indications are detected, a device may claim the ability to respond to an utterance and inform the computer system. The computer system then suppresses responses from the other devices that detected the same utterance. This can allow a response with very low latency, while still providing the coordination needed to avoid duplicative responses from other devices.

In some implementations, a computer-implemented method includes (i) receiving messages from a plurality of devices, each of the messages indicating a respective voice input detected by the device that sent the message; (ii) obtaining an audio signature for each of the voice inputs detected by the plurality of devices; (iii) evaluating the audio signatures for the voice inputs and times that the voice inputs were detected; (iv) based on evaluating the audio signatures for the voice inputs and the times that the voice inputs were detected, grouping at least some of the plurality of devices to form a group of multiple devices that detected a same user utterance; (v) selecting a device to respond to the user utterance from among the multiple devices in the group; and (vi) managing the multiple devices in the group so that only the selected device outputs a response to the user utterance.

The methods disclosed herein can be implemented by one or more computers, including a system comprising one or more computers and one or more computer-readable media storing instructions that, when executed by the one or more computers, cause the one or more computers to perform the described operations. In some implementations, one or more non-transitory computer-readable media can store instructions that, when executed by the one or more computers, cause the one or more computers to perform the described operations. The disclosed methods, techniques, systems, and devices can also include one or more of the features discussed below.

In some implementations, the method further includes identifying a respective account associated with each of the plurality of devices, where grouping at least some of the plurality of devices includes defining the group to include devices that detected the same user utterance and that are associated with a same account.

In some implementations, the method further includes determining a location of each of the plurality of devices, where grouping at least some of the plurality of devices includes defining the group to include devices that detected the same user utterance and that are located at a same location.

In some implementations, evaluating the audio signatures for the voice inputs and times that the voice inputs were detected includes comparing the audio signatures to identify audio signatures that differ by less than a threshold amount and comparing times that the voice inputs were detected to identify devices that detected voice inputs that began within threshold amount of time from each other.

In some implementations, the method further includes obtaining a transcription of the respective voice inputs using an automatic speech recognition system. Here, grouping at least some of the plurality of devices can include defining the group to include devices that detected the same user utterance and that detected voice inputs determined to have transcriptions that are within a threshold level of similarity.

In some implementations, the voice inputs include a hotword, where the audio signatures are based on acoustic properties of the hotword.

In some implementations, the one or more computers implementing the method can include a server system, where the messages from the devices are received by the server system over a communication network. The method can further include (i) receiving, by the server system and from the devices, audio data of the voice inputs detected by the devices, and (ii) generating, by the server system, the audio signatures based on the received audio data of the voice inputs detected by the devices.

In some implementations, selecting the device to respond to the user utterance from among the multiple devices in the group includes selecting the device based on device types of the devices in the group.

In some implementations, selecting the device to respond to the user utterance from among the multiple devices in the group includes selecting the device based on noise levels of the detected voice inputs for the devices in the group.

In some implementations, selecting the device to respond to the user utterance from among the multiple devices in the group includes selecting the device based on levels of speech power in the detected voice inputs for the devices in the group.

In some implementations, selecting the device to respond to the user utterance from among the multiple devices in the group includes selecting the device based on a location of a user, a pose of the user, or an interaction of the user with one or more of the devices in the group.

In some implementations, selecting the device to respond to the user utterance from among the multiple devices in the group includes selecting the device based on audio data, image data, video data, or location data from one or more devices in the group.

In some implementations, managing the multiple devices in the group so that only the selected device outputs a response to the user utterance includes sending, to the selected device, a message directing the selected device to respond to the user utterance.

In some implementations, managing the multiple devices in the group so that only the selected device outputs a response to the user utterance includes sending, to each of the non-selected devices in the group, a message directing the non-selected device to not respond to the user utterance.

In some implementations, managing the multiple devices in the group so that only the selected device outputs a response to the user utterance includes sending, to the selected device, a message instructing the selected device to display a response.

In some implementations, the response to the user output by the selected device is a synthesized speech response to the user.

In some implementations, the user utterance is a first user utterance, and the method includes (i) based on evaluating the audio signatures for the voice inputs and the times that the voice inputs were detected, grouping at least some of the plurality of devices to form a second group of multiple devices that detected a same second user utterance, where the second user utterance overlaps in time with the first user utterance; (ii) selecting a device to respond to the second user utterance from among the multiple devices in the second group; and (iii) managing the multiple devices in the second group so that only the selected device outputs a response to the second user utterance.

Certain implementations of the disclosed methods, techniques, systems, and devices may have particular advantages. For example, comparing the timing and audio signatures of utterances detected by a device enables the system to determine those devices that detected the same utterance. By grouping devices that detected the same user utterance, the system creates a manageable set of devices from which it selects responding device, reducing the processing load on the computer system and speeding the time for device selection. By selecting only one responding device from each of the formed groups, the system eliminates the potential user confusion that could arise from multiple responses. Furthermore, selecting only one device to respond enables the other devices to remain available to respond to voice commands from other users. The system can select the responding device based on various criteria, including device type, audio power, and background noise power, providing flexibility for different device selection in different situations.

The details of one or more implementations are set forth in the accompanying drawings and the description below. Other potential features and advantages of the disclosure will be apparent from the description, the drawings, and the claims.

BRIEF DESCRIPTION OF THE DRAWINGS

Like reference numbers and designations in the various drawings indicate like elements.

DETAILED DESCRIPTION

Figure 1A:
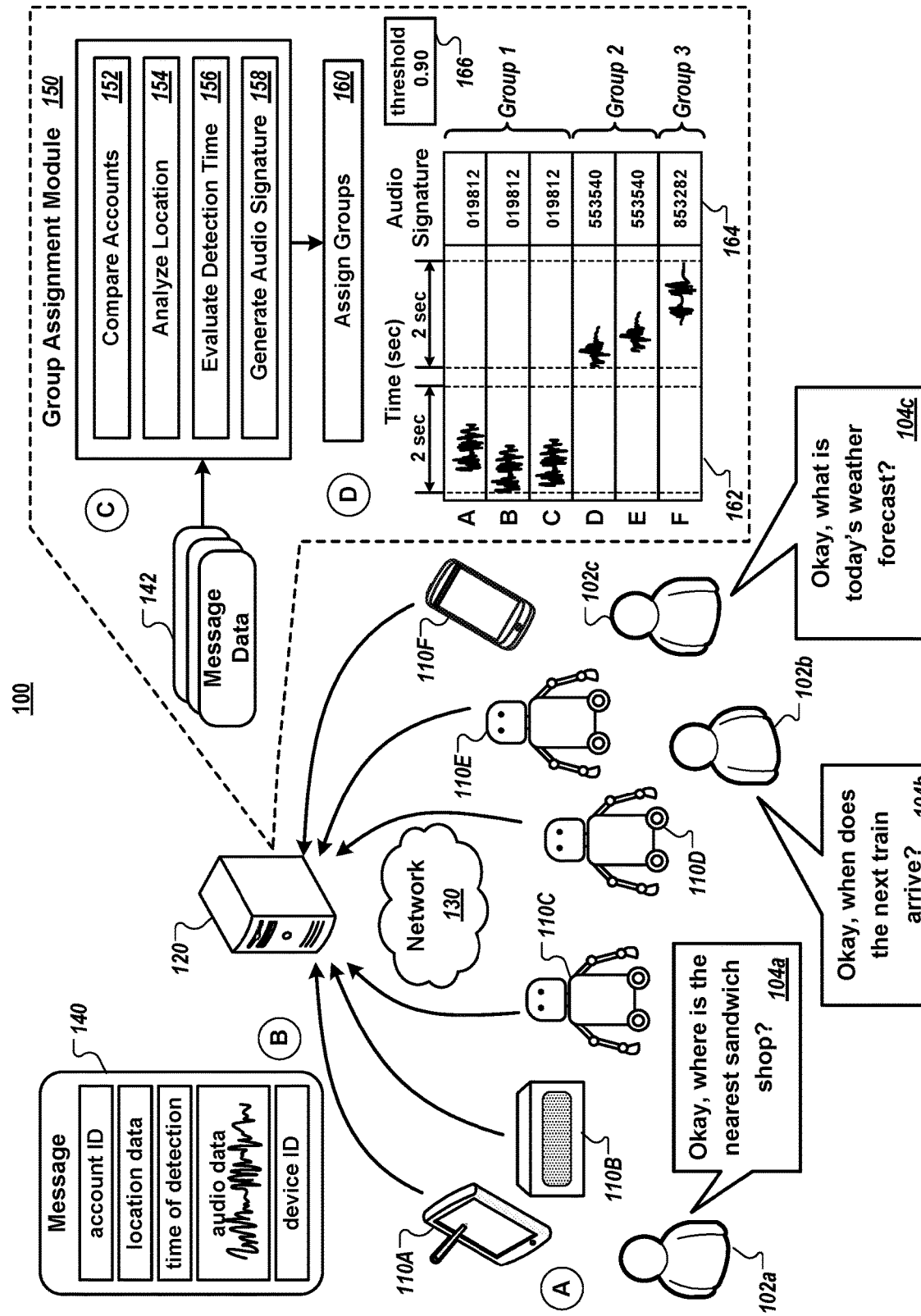
FIG. 1A is a diagram illustrating an example of grouping devices using a system for managing voice interface devices.

In some implementations, a computer system uses a two-stage process for managing voice interface devices. First, the computer system creates groups of the devices that detected the same user utterance. The computer system identifies devices that are associated with the same account and are located in the same location, and then determines which of those devices detected the same utterance. To determine which devices detected the same utterance, the computer system can compare the detection times of the detected utterances, audio signatures for the detected utterances, or other features. FIG. 1A shows an example of this technique for grouping devices.

Figure 1B:
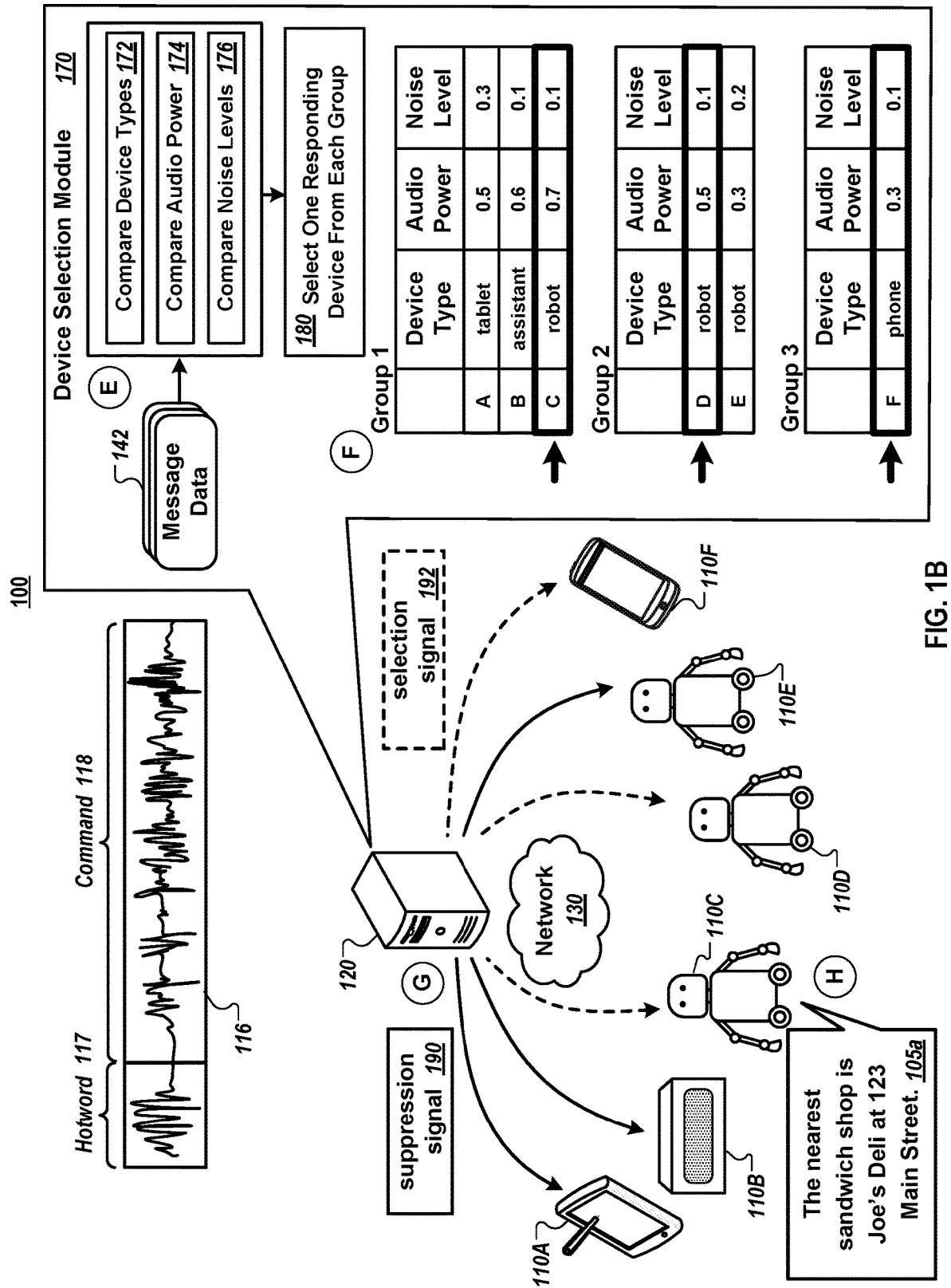
FIG. 1B is a diagram illustrating an example of selecting devices from groups using a system for managing voice interface devices.

Second, once the devices have been grouped by detected utterance, the computing system selects a single device from each group to respond to the utterance for the group. The responding device can be selected based on various factors, including device type, audio signal power, and background noise. FIG. 1B shows an example of this technique for selecting a device from a group of devices.

FIG. 1A is a diagram illustrating an example of grouping devices using a system 100 for managing voice interface devices. The system 100 includes multiple devices 110A through 110F ("devices 110") and a computer system 120. The device 110 that are capable of detecting and responding to voice commands. The devices 110 are at the same location, such as a hotel lobby or airport, where more than one device 110 may detect the same utterance from a particular user. Furthermore, different users at the location may speak different utterances at similar times, e.g., overlapping or beginning within a few seconds of each other, which may be detected by different sets of devices 110. The computer system 120 communicates with the devices 110 and assigns specific devices to respond to specific user utterances. FIG. 1A also shows several stages marked (A) to (D), which represent a flow of data and actions of the system.

In the example of FIG. 1A, the devices 110 detect three different utterances 104a, 104b, 104c spoken at similar times by three users 102a, 102b, 102c, respectively. The devices 110 provide data related to the detected utterances to a computer system 120. Based on analyzing the data, the computer system 120 creates groups of the devices 110 that detected the same user utterance.

The devices 110 can be any appropriate type of voice interface device, for example, a smart phone, a robot, an electronic assistant, a smart speaker, a tablet computing device, a computer, a laptop, or another electronic device capable of responding to a voice command. The devices 110 typically each include a processor capable of performing operations and processing data, as well as one or more memory systems. Generally, the devices 110 also include a microphone for detecting audible input, as well as a speaker, display, or other means for interacting with a user. In system 100, the device 110A is a tablet computer, the device 110B is an electronic assistant, the devices 110C, 110D, 110E are robots, and the device 110F is a smart phone.

The devices 110 are located at the same location. For example, the devices 110 may be located at a hotel to advise guests, at an airport to direct travelers, or at a store to assist customers. In some implementations, the multiple devices 110 may share the same user account. In the examples above, the multiple devices 110 may all be logged in to or be otherwise linked to the same hotel, airport, or store account.

At the location, a user 102a speaks an utterance 104a. The utterance 104a includes a voice command which can be a query, an instruction, or another command to a device 110. For example, the utterance 104a may express a request for information (e.g., "Where is the nearest bank?") or an instruction to the device (e.g., "Robot, please take my luggage to my room.").

An utterance may include a spoken hotword. A hotword is a predetermined word or phrase used to activate the voice interface of the multiple devices 110. The hotword may precede the voice command and may indicate to the device 110 that the user 102a is addressing it and requesting a response. A device may be configured to wake from a low-power state or otherwise activate an interface of the device in response to detecting the hotword. Devices can be configured to ignore utterances that do not start with the hotwords, thus allowing a user to clearly address a command to a device by starting with the hotword. In some implementations, the devices 110 are each configured to automatically respond when they detect a hotword followed by a voice command, subject to the management and control of the computer system 120. The multiple devices 110 may be configured to recognize and respond to the same hotword, for instance, if the multiple devices 110 share the same user account. A hotword is not required, however, and the devices 110 may be configured to respond to user utterances that do not begin with a predetermined hotword.

In the example, the user 102a speaks the utterance 104a, which includes the hotword "Okay" followed by a voice command query, "where is the nearest sandwich shop?" The devices 110 are configured to detect the hotword "Okay" as a signal that a voice command follows, and then use the remainder of the utterance as a voice command to be interpreted and acted on.

In some environments, different users may speak different utterances at a similar time. For example, different guests in a hotel lobby may speak utterances that include voice commands at similar times. Utterances may be different because they are spoken by different users and/or because they contain different speech content.

The example of FIG. 1A includes three different users, 102a, 102b, 102c that speak three different utterances 104a, 104b, 104c, respectively, at similar times, e.g., within a few seconds of each other. Each of the utterances 104a, 104b, 104c includes the hotword "Okay," followed by different queries, i.e., "where is the nearest sandwich shop," "when does the next train arrive," and "what is today's weather forecast" for the utterances 104a, 104b, and 104c, respectively.

During stage (A), the devices 110 detect the utterances 104a, 104b, 104c. For example, the devices can each detect the utterances through a microphone included as part of the device. Based on the placement of the devices 110 and the users 102a-102c, not all the devices 110 may detect each of the utterances, or different devices 110 may detect the utterances with different intensity or clarity.

If the devices 110 are located near enough to one another, more than one device 110 may detect the same utterance from a particular user. For example, in FIG. 1A, the devices 110A, 110B, 110C are located near to one another such that all three devices detect the same utterance 104a spoken by user 102a. The devices 110D, 110E are located some distance away from the first three devices, but close to each other such that both detect the utterance 104b spoken by user 102b. The device 110F is located further away and is the only device 110 to detect the utterance 104c spoken by user 102c.

During stage (B), the devices 110 send data related to the detected utterances to a computer system 120. The computer system 120 can be one or more computers, servers, server systems, workstations, or other computing devices. The computer system 120 includes one or more processors (e.g., CPU, GPU) configured to perform operations, as well as one or more memory systems for storing data. In some implementations, the computer system 120 can be a cloud computing platform or other remote computing system.

The devices 110 can communicate with the computer system 120 through a network 130. The network 130 can include any combination of wired and/or wireless networks that allows for the exchange of electronic data between the devices 110 and the computer system 120. The network 130 can include, for example, cellular telephony or wireless data networks, local area networks (LANs), wide area networks (WAN), Ethernet systems, and/or the Internet.

In some implementations, each device 110 that detected an utterance informs the computer system 120 of the detection. The device 110 may send data in any appropriate form to perform this function. This communication is referred to as a message 140, but is not limited to a specific format or form. For example, the message 140 may be a notification, an indication, data transfer, request made according to an application programming interface (API), a direct communication or an indirect communication, and so on. As shown in FIG. 1, each device 110 respectively sends a message 140 to the computer system 120, where the message 140 includes various data related to the device 110 and/or the detected utterance. The messages 140 from the devices 110 will usually differ somewhat, since different devices may detect different audio due to their different hardware, configuration, and location. For example, the message 140 can include information indicating the type or identity of the device 110 receiving the utterance, the user account associated with the device 110, and a time at which the utterance was detected. In some examples, the message 140 includes data related to the location of the device 110 (e.g., GPS data, IP address, network information). The message 140 also includes audio data related to the detected utterance, for example, data describing acoustic characteristics of an audio signal of the utterance received by the device. For example, the audio data may represent extracted acoustic features from the detected utterance or raw audio waveform data. In the example of FIG. 1A, each device 110 sends message data to the computer system 120 that includes an account ID, location data, a time of detection of the utterance, audio data related to the detected utterance, and a device ID that indicates the type of the device (e.g., smart phone, electronic assistant, robot).

In stage (C), the computer system 120 analyzes the message data 142 received from the multiple devices 110 to identify groups of devices that received the same utterance. In some implementations, the computer system 120 includes a group assignment module 150 that performs various analyses and processes to determine whether the devices 110 detected the same utterance. In the system 100, the group assignment module 150 performs processes 152, 154, 156, and 158 for determining whether the devices 110 detected the same utterance. Though described below in a particular order, it should be understood that other process orderings and combinations (e.g., omitting one or more processes, adding additional processes) are possible and are within the scope of this disclosure.

The group assignment module 150 compares the accounts of the devices 110 that detected utterances (152). For example, the computer system 120 may receive message data 142 from many devices, where those devices are used by different organizations (e.g., an airport, a hospital, a hotel). The system 120 may also receive data from devices from the same organization used for different purposes (e.g., a hotel device for registering guests versus a hotel device for ordering room service) or in different locations (e.g., a hotel device in the first floor lobby versus a hotel device in a hotel restaurant). The devices 110 can be configured such that devices 110 used for the same purpose or in the same location share the same account.

The module 150 can compare the device accounts by analyzing account ID data included in the message data 142. The module 150 can then group the devices 110 by account and subsequently select one device per account to respond to the detected utterance. By distinguishing devices 110 by account, the computer system 120 limits the number of devices it must analyze for subsequent selection, reducing the processing load. In the example of FIG. 1A, all devices 110A through 110F are associated with the same account.

For devices 110 that share a common account, the group assignment module 150 can also analyze the location of the devices (154). In system 100, the module 150 analyzes the device location data contained in the received message data 142 to distinguish devices that share the same account, but are not located in the same place. For example, the module 150 can use device location data to distinguish between devices 110 on a common hotel account that are located in different locations of the hotel (e.g., a robot 110 in the hotel lobby versus a smart speaker 110 located in a hotel restaurant). The module 150 divides devices 110 that are in different locations into different groups, as devices 110 in different locations are unlikely to have detected the same utterance. In the example of FIG. 1A, the location data indicates that all devices 110A through 110F are in the same location. Location data from the devices 110 can take many forms, such as a GPS location detected by a device, an address or other location indicator where the device is assigned, an indication of a location beacon or wireless access point (e.g., a Wi-Fi access point) near the device, and so on. The computer system 120 may consider devices to be in the same location when they are determined to be within a threshold distance of each other, e.g., within 25 feet, or within 50 feet, etc.

For devices that share the same account and are in the same location, the group assignment module 150 evaluates the detection time of the detected utterances (154). In particular, the module 150 evaluates the detection times of the detected utterances to determine whether detection occurred within a particular range of time (e.g., two seconds) of each other. Devices 110 detecting the same utterance should detect it at nearly the same time. Thus, the module 150 uses the detection times to assess whether devices detected the same utterance. The module identifies the initial time of detection of an utterance by a first device, and determines whether any other devices also detected an utterance that began within a predetermined interval from that detection. The module 150 determines that the devices 110 that also detected the start of an utterance within an interval or time window of a predetermined duration (e.g., two seconds) may have detected the same utterance as the first device. Conversely, devices 110 that detected the start of an utterance outside of the time interval are determined to have detected an utterance different from the one detected by the first device.

The predetermined duration for time intervals can be set by the computer system 120 or a system administrator to account for factors that impact the time an audio signal is detected by the different devices 110. For example, the time interval can be set to account for the different distances between the speaker and the devices 110 (e.g., the difference in time required for the audio energy to reach the device 110) or differences in hardware and software that impact audio detection by a particular device 110. Generally, the time interval can be set to represent an amount of time (e.g., a fraction of a second to a few seconds) in which the evaluated devices 110 would be expected to detect the same utterance. In the example, the time intervals used each have a duration of two seconds. In other implementations, the time interval could be greater or less than two seconds (e.g., less than one second, several seconds, etc.).

The time interval can be set in advance and may be stored in a memory system of the computer system 120. In some implementations, the duration of the time interval can be different for devices using different accounts or in different locations (e.g., one time interval duration for devices in a hotel and a different time interval duration for devices in an airport), where the factors impacting device audio detection time may differ.

In FIG. 1A, chart 162 shows the time of detection data received by the computer system 120 from the devices 110. Using time intervals of two seconds, the module 150 determines that the devices 110A, 110B, 110C detected utterances within a first two-second time interval, indicating that they may have detected the same first utterance. The module 150 determines that the devices 110D, 110E, 110F detected utterances within a second two-second time interval that is outside of the first time interval. As a result, the module 150 determines that the devices 110D, 110E, 110F may have detected the same second utterance, where the second utterance is different than the first utterance.

Not all devices that detected an utterance within a predetermined time interval necessarily detected the same utterance. To determine those devices that detected the same utterance within the same time interval, the group assignment module 150 generates an audio signature of each utterance detected within a given time interval (156). The audio signature can be, for example, a 64-bit integer, a hash value or code, a decomposition vector, a matrix, an audio fingerprint, or another representation of the audio content of the utterance. The module 150 can generate the audio signature by processing (e.g., filtering, transforming, applying a function to) the audio data received from each device 110. The module 150 can generate a signature using the entire audio data for an utterance or using a portion of the audio data. For example, the module may generate a signature using only the portion of audio data corresponding to the hotword. In some implementations, the devices 110 may generate audio signatures instead of the computer system 120. For example, devices 110 may send an audio signature of a detected hotword and/or other portions of an utterance in the message 140 to the computer system 120.

The audio signature for a given utterance is generally unique to a particular user, and in many cases unique to the specific utterance. The audio signature is based on the speech characteristics of the audio data for the utterance. The audio signatures are generated so that a spoken command will have an audio signature that is noticeably different from a different command spoken by the same user, and from the same command spoken by a different user. As a result, audio data based on the same utterance (e.g., by the same user) but received by different devices will have the same or similar audio signatures. Conversely, audio data based on different utterances (e.g., by different users) will have different audio signatures.

In some implementations, the module 150 determines that the devices 110 received the same utterance if the match between the audio signatures generated from the device's audio data match exceeds a particular match threshold 166. In some examples, the module 150 evaluates the match between audio signatures by determining a match score. The match score can be, for example, a distance between audio signatures, a correlation of signatures, or another value or values that indicate a likelihood that the audio signatures correspond to the same utterance.

For example, the module 150 may determine a match score of 0.95 for the audio signatures generated from audio data received by two devices 110. If the module 150 requires a match threshold 166 of 0.90, because the match score exceeds the match threshold 166, the module 150 determines that the two devices 110 detected the same utterance.

The match threshold can be a confidence level, a minimum distance between audio signatures, or another criteria indicating the likelihood that multiple audio signatures correspond to the same utterance. In some examples, the match threshold 166 is configurable. For example, the match threshold 166 can be set to a lower value for audio data received in noisy environments, where audio signatures derived from the same utterance may be expected to vary more due to the noise.

The module 150 generates an audio signature for a particular device 110 that is a six-digit integer based on the content of the audio data received by that device 110. In FIG. 1A, the audio signatures generated for the devices 110 are shown in column 164. Because the audio data received by the devices 110A, 110B, 110C were based on the same utterance 104a, their audio signatures are the same six-digit integer ("019812"). Similarly, because the audio data received by the devices 110D, 100E were based on the same utterance 104b, their audio signatures are the same six-digit integer ("553540"), which is different from the audio signatures based on the utterance 104a. Finally, because the audio data received by the device 110F was based on the utterance 104c, its audio signature is a six-digit integer ("853282") that is different from the signatures based on the utterances 104a, 104b.

The system 100 of FIG. 1A uses a match threshold 166 of 0.90, indicating that the match score for different audio signatures must be greater than or equal to 0.90 for the module 150 to determine that the signatures correspond to the same utterance.

Based on the analyses, in stage (D), the group assignment module 150 assigns the devices 110 to groups, where each group consists of devices 110 that detected the same utterance (160). For example, the module 150 assigns the devices 110 with different accounts or different locations to different groups. For devices 110 that share a common account and location, the module 150 evaluates the time of detection and audio signature of the audio data to determine whether the devices 110 detected the same utterances. The module 150 may first evaluate the time of detection, grouping those devices 110 that detected an utterance in the same time interval. The module 150 may then compare the generated audio signature for each device 110 that detected an utterance within the time interval to determine whether the devices detected the same utterance. The module 150 then assigns groups according to those devices 110 that detected the same utterance.

For example, in FIG. 1A, based on analyzing the message data 142, in processes 152 and 154, the module 150 determines that the devices 110A through 110F share the same account and are in the same location. Based on evaluating the time of detection data, shown in chart 162, the module 150 determines that devices 110A, 110B, 110C detected utterances within a first time interval, while devices 110D, 110E, 110F detected utterances within a second time interval.

To determine whether devices 110A, 110B, 110C detected the same utterance, the module 150 compares their generated audio signatures, as shown in column 164. In this example, because the audio signatures for devices 110A, 110B, 110C are the same, the module 150 determines a match score of 1.0 for all three signatures. Based on the match score of 1.0, which is greater than the match threshold 166 of 0.90, the module 150 determines that the devices 110A, 110B, 110C detected the same utterance and assigns the devices 110A, 110B, 110C to the same group (Group 1).

Because devices 110D, 110E, 110F detected utterances within a second time interval, the module 150 determines they detected a second utterance, different than the utterance detected by the Group 1 devices. To determine whether devices 110D, 110E, 110F detected the same second utterance, the module 150 compares their generated audio signatures, as shown in column 164. In this example, because the audio signatures for devices 110D, 110E are the same, they have a match score of 1.0, which is greater than the match threshold 166 of 0.9. As a result, the module 150 determines that the devices 110D, 110E detected the same utterance and assigns them to the same group (Group 2).

The module 150 determines that the match score for the audio signature for device 110F relative the signatures of the Group 2 devices (devices 110D, 110E) is 0.33. Because the match score is less than the match threshold 166 of 0.90, the module 150 determines that the device 110F detected a different second utterance and assigns device 110F to Group 3.

As a result, in the example of FIG. 1A, the module 150 determines that three distinct utterances were detected by the devices 110, corresponding to the utterance of Group 1, the utterance of Group 2, and the utterance of Group 3.

In some implementations, the module 150 can use other features of the message data 142 to determine whether the devices 110 detected the same utterance and thus belong in the same group. For example, the module 150 can compare the background noise power of the received audio data. If the background noise power received by two devices 110 is sufficiently different, the module 150 may determine that the two devices 110 are likely in different environments (e.g., different locations) and so probably are not detecting the same user utterance. As another example, the computer system 120 may use an automated speech recognition system to determine a transcription of the audio data from the different devices. If the text of the transcriptions have at least a threshold level of similarity, the devices may be confirmed to have detected the same utterance. However, if the text of the transcriptions does not have at least the threshold level of similarity, the devices can be considered to have detected different utterances.

FIG. 1B is a diagram illustrating an example of selecting devices from groups using the system 100 for managing voice interface devices. FIG. 1B continues the process of assessing and responding to the user utterances illustrated in FIG. 1A. FIG. 1B also shows several stages marked (E) to (H), which represent a flow of data and actions of the system.

After grouping the devices 110 by utterance, the computer system 120 selects one device 110 from each group of devices 110 to respond to the utterance. The devices 110A through 110F have been grouped into Groups 1, 2, and 3 as described above. For each group of devices, based on the message data 142 received from the devices 110, the computer system 120 selects one device from each group to respond to the utterance. In examples where the devices 110 are configured to automatically respond to a received voice command, the computer system 120 can select a responding device 110 by sending a suppression signal 190 to those devices 110 that were not selected to respond. In some examples, the computer system 120 may send a selection signal 192 to individual devices 110 that have been selected to respond. The selected device 110 can then respond to the utterance, for example, by outputting synthesized speech.

In some implementations, the computer system 120 includes a device selection module 170 for selecting responding devices. The device selection module 170 accepts as input the message data 142 provided by the devices 110. In some examples, the message data 142 is processed before being input to the selection module 170 (e.g., by the group assignment module 150 or by another process of the computer system 120).

In stage (E), the device selection module 170 analyzes the message data 142 for the devices 110 in each group of devices. In some implementations, the module 170 compares the types of devices (172), the audio power of the audio data received by the devices (174) and/or the noise level of the audio data received by the devices (176) to determine which device 110 to select as the responding device.

In comparing the types of devices (172), the module 170 may apply one or more device type criteria for selecting devices. The device type criteria indicate preferences for the types of devices that respond to an utterance when multiple devices are capable of responding. The device type criteria can be predetermined or set by an administrator of the computer system 120. In some examples, the device type criteria are stored in a memory system of the computer system 120.

In some implementations, the criteria include a prioritized list (e.g., a hierarchy) of device types, where the device types are listed in order of most preferred for responding to least preferred for responding. For example, the criteria may indicate that a robot is the preferred respondent over an electronic assistant, which is the preferred respondent over a smart phone. In comparing the types of the devices within a group of devices 110, the module 170 selects the device 110 with the most preferred type to respond to the detected utterance.

The device selection module 170 can also compare the audio power of the audio data received by the devices (174) to select a responding device. For example, if two or more devices in a group are of the preferred device type, the module 170 can compare the audio power received by the preferred devices 110 and select as the responding device that device 110 with the highest audio power. By selecting the device 110 with the highest audio power, the module 170 selects the device 110 that is likeliest the closest to the user that spoke the utterance.

The module 170 can estimate the audio power of the audio data received by a devices 110 by measuring the audio power of all or part of the audio data received by the device 110. For example, an audio signal 116 received by a device 110 can include two audio segments, a hotword 117 and a command 118. In many cases, the hotword 117 precedes the command 118, as in the example of FIG. 1A, where the utterances 104 include the hotword "Okay" followed by a query. In some implementations, the module 170 estimates the audio power by measuring the energy of the audio data that corresponds to the hotword 117. The module 170 can then select the device 110 that has the highest hotword 117 audio power. In some implementations, the module 170 estimates the audio power by measuring the energy of the audio data that corresponds to the command 118 or to the entire audio signal 116 (e.g., including both the hotword and the command), then selects the device 110 with the highest audio power as the responding device.

In some implementations, the device selection module 170 compares the noise level of the audio data received by one or more of the devices 110 to select a responding device (176). Similar to estimating audio power, the module 170 can estimate the noise level by measuring the noise energy or noise power of the audio data that corresponds to all or part of the audio signal (e.g., the hotword 117, the command 118, or the entire audio signal 116). The module 170 then selects as a responding device the device 110 that has the lowest noise level.

In some implementations, the module 170 compares the audio power or noise level of the audio data only if device selection cannot occur based on device type (e.g., two or more devices in the group of devices are of the preferred device type). In those situations, the module 170 may estimate and compare the audio or noise level only of those devices of the preferred device type (e.g., as a tie-breaker).

The module 170 can also use other characteristics to select a responding device. For example, the module 170 can estimate and compare the signal-to-noise ratio of a part or all of the audio data to select a responding device. In some implementations, the module 170 can perform speech recognition on the audio data received by each device in a group and select the device 110 whose speech recognition output it determines to be the most accurate.

In stage (F), based on the analyses, the device selection module 170 selects one responding device from each group of devices (180). In the example of FIG. 1B, for Group 1, based on the device ID information in the received message data 142, the module 170 determines that the device 110A is a tablet computer, the device 110B is an electronic assistant, and the device 110C is a robot. The module 170 accesses device type criteria indicating that a robot is preferred over an electronic assistant which is preferred over a tablet computer. Because device 110C is a robot, which is preferred over a tablet computer (the device 110A) and an electronic assistant (the device 110B), the module 170 selects device 110C out of the Group 1 devices to respond to the detected utterance.

For Group 2, based on the device ID information in the received message data 142, the module 170 determines that both devices 110D, 110E are robots. As a result, the module 170 cannot select between the devices 110D, 110E based on device type. The module 170 then determines the audio power of the audio data received by each device. In FIG. 1B, the module 170 determines a normalized audio power of 0.5 for the device 110D and a normalized audio power of 0.3 for the device 110E. Often, a greater audio power for detected speech represents that a device is closer to the user that spoke the utterance, or that the user is facing more toward the device with the higher audio power. The module 170 then selects the device with the greater audio power, device 110, to respond to the detected utterance.

Because the device 110F is the only device 110 in Group 3, the module 170 selects the device 110F to respond to the detected utterance.

In stage (G), the computer system 120 sends one or more signals to one or more of the devices 110 indicating the selected responding device or devices.

In some implementations, the devices 110 are configured to automatically respond to a detected utterance. In such cases, the computer system 120 can send suppression signals 190 to the devices 110 that were not selected to respond to an utterance. The suppression signals 190 instruct the receiving devices 110 not to respond to the detected utterance. In the example of FIG. 1B, the computer system 120 sends suppression signals 190 to the devices 110A, 110B, and 110E, which were not selected as responding devices.

In some implementations, the computer system 120 sends selection signals 192 to the devices 110 that were selected to respond to the utterance. The selection signals 192 instruct the devices 110 that they were selected as a responding device. In the example of FIG. 1B, the computer system 120 sends selection signals 192 to the devices 110C, 110D, 110F.

In stage (H), the selected responding devices 110 respond to the user utterance. In some implementations, the selected devices 110 respond by outputting synthesized speech related to the voice command of the utterance. For example, in FIG. 1B, the Group 1 devices 110 detected the user utterance 104a, which included the voice command, "where is the nearest sandwich shop?" The selected device from Group 1, device 110C, responds by outputting the synthesized speech response 105a, "The nearest sandwich shop is Joe's Deli at 123 Main Street."

In addition to, or instead of, outputting synthesized speech, the selected devices 110 can also respond to the user utterance by performing an action (e.g., performing the action requested by the voice command of the user utterance), displaying information on a display (e.g., a screen) of the device, launching a software application, or performing another operation related to the voice command of the detected utterance. For example, a selected device 110 can respond by executing the voice command (e.g., dialing a taxi-service if the command is "Call me a cab") or displaying information requested by the voice command (e.g., displaying a map and list of directions if the command is "How do I get to the beach from here?").

Figure 2:
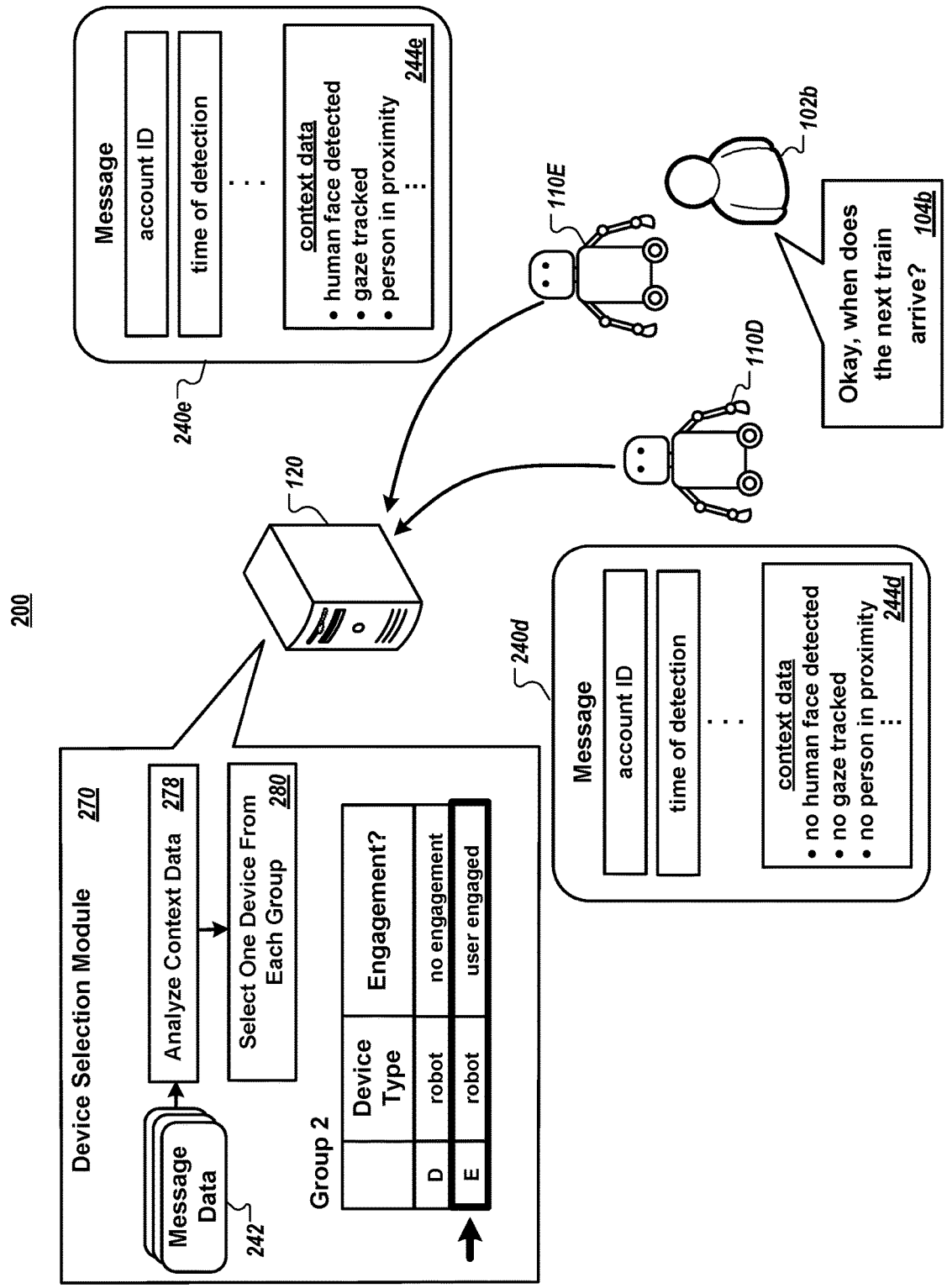
FIG. 2 is a diagram illustrating an example of selecting devices from groups using a system for managing voice interface devices.

FIG. 2 is a diagram illustrating another example of selecting responding devices from groups using a system 200 for managing voice interface devices. The system 200 includes the computer system 120 from the system 100, as well as the devices 110D, 110E of Group 2.

In system 200, the message data 242 received by the computer system 120 from the devices 110 includes context data 244d, 244e, where the context data 244d, 244e may provide indications of user engagement. Based on the context data 244d, 244e if the computer system 120 determines that a user is likely engaged with one device 110 in a group of devices, it selects that one device to respond to the utterance.

In system 200, the devices 110D, 110E both detected the same utterance 104b from the user 102b of FIG. 1A. Based on determining that they detected the same utterance, the computer system 120 grouped the devices 110D, 110E together (e.g., into Group 2, as described above). In system 200, in addition to sending account, device, timing, and audio data to the computer system 120, the devices 110D, 100E also send context data 244d, 244e, respectively.

The context data 244d, 244e can include data indicating whether a user is engaged with the particular device. In some examples, one or more of the devices 110 include hardware and/or software that provide an indication of user engagement with the particular device 110D or 100E. For example, a device 110D, 110E can include hardware for receiving input from a user, for instance, a keyboard, a keypad, a touchscreen, a joystick, a mouse, or other means for a user to input data to the device. The devices 110 can also include sensors for interacting with a user, for instance, one or more cameras, vision systems, proximity sensors, radar, LIDAR, or other sensors. The hardware and/or software can provide the device 110D, 100E with an indication that a user is engaged with it (e.g., a user is inputting data to a touchscreen, a user is touching or holding the device, a user is standing near to the robot and gazing in its direction). Devices 110 may evaluate sensor data when utterances are detected to determine whether factors indicating user engagement are present.

In some examples, the context data 244d, 244e can include proximity sensor data that detects when a user is near the device, image data from a camera that shows whether a user is facing the device, or processed data that indicates whether a user is gazing at the device. The context data 244d, 244e can also include information indicating that a user is using, or recently used, a component or peripheral of the device (e.g., inputting data through a touchscreen, keyboard, mouse, or joystick). In addition, or as an alternative to sending results of analyzing sensor data, the devices 110 may include sensed information in the context data 244d, 244e sent to the computer system 120. For example, a device 110 may send image data, video data, motion sensor data, or other data to the computer system 120, which can evaluate whether a user is engaged with the device.

The system 200 includes a device selection module 270. The module 270 is implemented by the computer system 120 and can, for example, be similar to the module 170 of system 100, with additional functionality for analyzing context data 244d, 244e. In some implementations, the device selection module 170 analyzes the context data 244d, 244e for indications of user engagement (278). The module 270 can receive context data 244d, 244e as part of the message data 242 received from the devices 110. Based on the context data 244, the module 270 determines whether a user is likely engaged with the device. For example, the module 270 may determine that a user is likely engaged with a device if the device's context data 244d, 244e indicates that a human face is detected, a person's gaze is directed at the device, a person is in a particular pose near the device, or a person is walking towards the device. In some implementations, the module 270 determines that a user is likely engaged with a device if the device detected recent use of a component or peripheral of the device (e.g., input to a touchscreen or keyboard).

If the module 270 determines that one device out of the group of devices has an engaged user, the module 270 selects that device as the responding device. After selecting a responding device, the computer system 120 can follow by sending suppression signals or selection signals to the devices 110D, 100E, as appropriate.

In the example of FIG. 2, the devices 110D, 110E are robots that include cameras and proximity sensors that can provide indications of user engagement. The device 110D sends context data 244d in a message 240d to the computer 120. The context data 244d indicates that the camera of device 110D does not detect a human face, it did not detect a person's gaze toward the device 110D, and its proximity sensor indicates that no person is in near proximity to the device 110D.

At a similar time, the device 110E sends context data 244e in the message 240e indicating that the robot's camera detects a human face, a person's gaze was directed at or near the device 110E, and the robot's proximity sensor indicates that a person is in near proximity to the device 110E.

Based on the received context data 244d, 244e, the device selection module 270 determines that there likely is a user engaged with the device 110E and that there likely is not a user engaged with device 110D. Because a user is likely engaged with one device in the Group 2 devices, the module 170 selects the engaged device 110E as the responding device.

In some implementations, the computer system 120 uses indications of user engagement as described in FIG. 2 to supplement the device selection techniques described in FIG. 1B. For example, the computer system 120 can first evaluate indications of user engagement based on the received context data 244. If the computer system 120 determines that a user is likely engaged with one particular device out of a group of devices, the computer system 120 can select that device as the responding device. In this manner, the device selection module 270 may prioritize engagement factors over other considerations, such as noise levels, audio power, or device type. For example, even if the device 110D detected the utterance with higher speech audio power and with lower noise than the device 110E, the device 110E may still be assigned to respond, since the computer system 102 determines that user 102b has interest or attention focused on the device 110E. If the computer system 120 does not select a device based on user engagement, it can proceed to select a device according to the techniques described in FIG. 1B (e.g., based on device type, audio power, noise level, or other characteristics).

Figure 3:
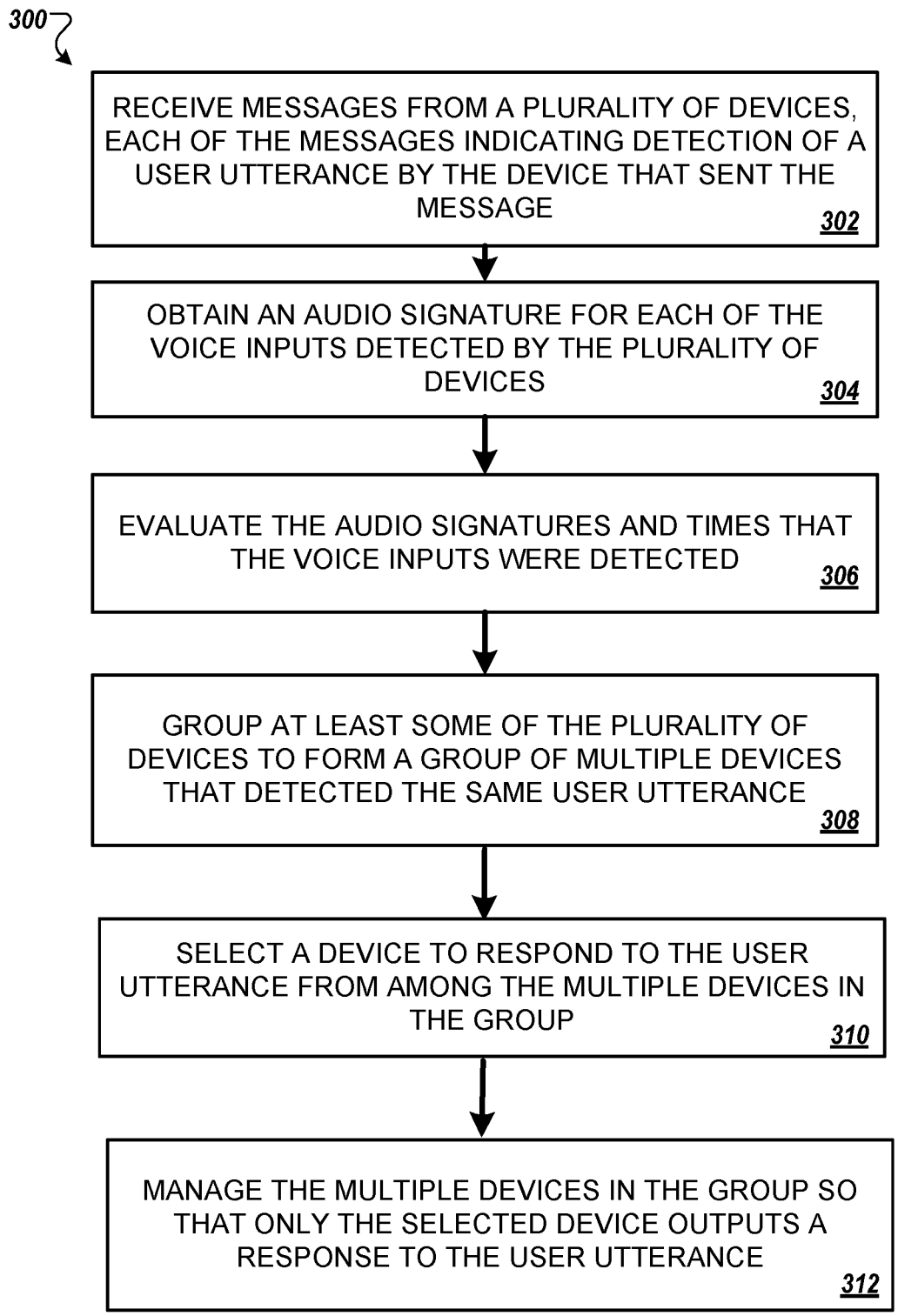
FIG. 3 is a flow diagram illustrating an example of a method for managing voice interface devices.

In some examples, a particular device 110D, 100E may itself determine that a user is engaged with it. This can occur, for example, when the device 110D, 100E detects strong evidence of user engagement, such as particular touch screen input, a particular pose of a person standing in front of the device 110D, 100E, or a history of recent inputs by or interactions with a user. For instance, the device 110D, 110E may detect the utterance while it is in the midst of an interactive session with a user (e.g., a speech recognition training session). When these high-confidence signals are detected, the device 110D, 110E may override the typical selection process and claim the ability to respond to the utterance. The device 110D, 110E can send a message to the computer system 120 claiming the response. The computer system 120 can then grant the device 110 the ability to respond and send suppression signals to the other devices 110D, 110E that detected the same utterance. By overriding the typical selection process when there is strong evidence of user engagement with a particular device 110D, 110E, the computer system 120 can avoid subsequent selection processing, reducing its computing load and enabling a faster response to the user utterance FIG. 3 is a flow diagram illustrating an example of a method 300 for managing voice interface devices. The method 300 can be implemented by one or more computers, for example, the computer system 120 of systems 100, 200. Briefly, method 300 includes receiving, by one or more computer, messages from a plurality of devices, each of the messages indicating detection of a user utterance by the device that sent the message (302); obtaining an audio signature for each of the voice inputs detected by the plurality of devices (304); evaluating the audio signatures and times that the voice inputs were detected (306); grouping at least some of the plurality of devices to form a group of multiple devices that detected the same user utterance (308); selecting a device to respond to the user utterance from among the multiple devices in the group (310); and managing the multiple devices in the group so that only the selected device outputs a response to the user utterance (312).

In more detail, the method 300 includes receiving, by one or more computers, messages from a plurality of devices, each of the messages indicating a respective voice input detected by the device that sent the message (302). The devices can be, for example, smart phones, cellular phones, robots, tablet computing devices, computers, electronic assistant devices, smart speakers, entertainment devices, wearable devices (e.g., a smart watch) or other devices capable of receiving and responding to voice input. The messages provided by the devices can be electronic communications and may include various data related a voice input detected by a particular device. For example, a device may provide a message indicating that the device detected a voice input. The messages can include audio data related to the detected voice input, time of detection data, or other information related to the received voice input. In some implementations, the messages may include output of a speech-recognition system for the detected voice input. The messages can also include data related to the configuration of the device itself, including account or location information, a device identifier, or another indication of the device type.

In some implementations, the one or more computers may include a server system and the messages from the devices are received by the server system over a communication network, where the communication network can be any combination of wired and/or wireless networks.

The method 300 further includes obtaining, by the computer, an audio signature for each of the voice inputs detected by the plurality of devices (304). In some implementations, the computer or server system generate an audio signature for each voice input based on audio data of the voice inputs received from each device. In some implementations, the devices, themselves, generate an audio signature based on the detected voice input and provide it to the computer. The audio signature can be, for example, a hash value, a vector, or other representation of the detected voice input. The audio signature can be generated based on all or part of the detected voice input. For example, in some implementations, the voice inputs include a hotword and the audio signature is generated based on the acoustic properties of the hotword.

After obtaining an audio signature for each of the voice inputs, the computer evaluates the audio signatures for the voice inputs and times that the voice inputs were detected (306). For example, the computer can compare the times that the voice inputs were detected to identify those voice inputs that began within a threshold amount of time from each other (e.g., those voice inputs that were detected by the devices within a few seconds of one another). The computer can also compare the audio signatures to identify those signatures that differ by less than a threshold amount and thus likely correspond to the same utterance.

Based on evaluating the audio signatures for the voice inputs and the times that the voice inputs were detected, the computer groups at least some of the plurality of devices to form a group of multiple devices that detected a same user utterance (308). For example, among those devices that detected voice inputs that began within a threshold amount of time from each other (e.g., within a few seconds of one another), the computer can determine that a particular set of devices likely detected the same user utterance by comparing the audio signatures for the voice inputs detected by the devices. If the audio signatures differ by less than a particular threshold amount, the computer can group those devices as detecting the same user utterance.

In some implementations, the computer uses additional information to form the groups of devices. For example, the computer can identify a respective account associated with each of the plurality of devices (e.g., based on account information included in the messages provided by the devices). The computer can then define the group of devices to include devices that detected the same user utterance and that are associated with the same account. The computer can also determine a location of each device, for example, based on GPS data, an IP address, or network information. The computer can then define the group to include devices that detected the same user utterance at the same location.

In some implementations, the computer can obtain a transcription of the respective voice inputs using an automatic speech recognition system and group devices based on the similarity of the transcriptions. For example, each device may provide, as part of the message data sent to the computer, a transcription of the voice input detected by the device. In some examples, the computer may generate a transcription of the respective voice inputs by applying the audio data received from each device to a speech recognition system. Based on determining that the transcripts of a set of devices have transcriptions that are within a particular threshold level of similarity, the computer can group those devices as detecting the same user utterance.

The method 300 also includes selecting, by the computer, a device to respond to the user utterance from among the multiple devices in the group (310). For example, the computer can select one device from each formed group to respond to the particular user utterance.

In some implementations, the computer selects the responding device based on the device types of the devices in the group. For example, the computer can select the responding device because it is a preferred device type (e.g., select a robot over a smart phone).

In some implementations, the computer selects a responding device based on properties of the detected voice inputs for the devices in the group. For example, the computer can select the responding device based on the noise levels of the detected voice inputs for the devices in the group (e.g., select the device corresponding to the voice input with the lowest noise level), or the levels of speech power in the detected voice inputs (e.g., select the device corresponding to the voice input with the highest speech power).

In some implementations, the computer selects a responding device based on audio data, image data, video data, or location data from one or more devices in the group. For example, the received data can indicate a location of a user, a pose of the user, or a detected interaction of the user with one or more devices. The computer can then select a responding device based on the data or indicated characteristics (e.g., select the device with the user interacted or select the device that the user is facing).

After selecting a responding device from one or more formed groups, the computer manages the multiple devices in the group so that only the selected device outputs a response to the user utterance (312). For example, the computer can send a message to the selected device directing it to respond to the user utterance. In some implementations, one or more devices may be configured to automatically respond to the user utterance. Here, the computer can send, to each of the non-selected devices in the group, a message directing the non-selected devices to not respond to the user utterance.

In some implementations, the response output by the selected device is a synthesized speech response. The output response can also be another audio response (e.g., a prerecorded natural speech response), a visual response (e.g., displaying a response on a screen of the device), or another action. For example, the computer can send a message to the selected device instructing it to synthesize a speech response, play an audio recording, display a message to a user, vibrate the device, change a status of the device (e.g., go into power-save mode), actuate a component of the device (e.g., move a robot arm), or perform a command or operation indicated by the voice input. In some implementations, the response output by the device can include more than one action (e.g., outputting a synthesized speech response and displaying a message on a screen of the device).

In some implementations, the computer performs some or all of steps (302) through (312) for more than one group of devices (e.g., for each group of devices determined to detect a different utterance). For example, the computer may determine that the voice inputs of at least some of the devices detected a same first user utterance and that the voice inputs of at least some of the devices detected a same second user utterance, where the second utterance overlaps in time with the first utterance. In this case, the computer can form a first group of devices that includes those devices that detected the same first utterance and a second group of devices that includes those devices that detected the same second user utterance. The computer can then select a device to respond to the first user utterance from among the devices in the first group and a device to respond to the second user utterance from among the devices in the second group. The computer then manages the multiple devices such that only the selected device from the first group responds to the first utterance and only the selected device from the second group responds to the second utterance.

In some implementations, the computer performs steps (302) through (312) for each identified distinct utterance. In this case, if the computer identifies N distinct utterances (e.g., utterances by N different users) from the voice input detected by the multiple devices, the computer can form N groups of devices, where each group of devices includes those devices that received a particular utterance. The computer then can select one responding device from each of the N groups, such that each of the N distinct utterances receives a response from one device.

The features described can be implemented in digital electronic circuitry, or in computer hardware, firmware, software, or in combinations of them. The techniques can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The machine-readable storage device may be a non-transitory machine-readable storage device. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, a social networking platform, rather than an external application, may perform employment analysis and provide employment information to users of the social networking platform. Accordingly, other implementations are within the scope of the following claims.

What is claimed is:
1. A method performed by one or more computers, the method comprising:
  receiving, by the one or more computers, messages from a plurality of devices that have collectively detected two or more different voice inputs that overlap in time, each of the messages indicating a respective voice input of the two or more different voice inputs that was detected by the device that sent the message, the plurality of devices including a robot;
  obtaining, by the one or more computers and based on the messages, an audio signature for each of the two or more different voice inputs that overlap in time and that were collectively detected by the plurality of devices;
  receiving, by the one or more computers, context data from the robot that describes conditions in an environ- ment of the robot, the context data being based on sensor data captured by one or more sensors of the robot;

evaluating, by the one or more computers, the audio signatures for the two or more different voice inputs that overlap in time, and times that the voice inputs were detected;

based on evaluating the audio signatures for the two or more different voice inputs that overlap in time and the times that the voice inputs were detected, grouping, by the one or more computers, at least some of the plurality of devices to form a group of multiple devices that are determined, based on the evaluation of the audio signatures, to have detected a same one of the two or more different voice inputs that overlap in time, and that are each configured to respond to the one of the two or more different voice inputs, the group including the robot;

selecting, by the one or more computers, the robot from among the multiple devices in the group based on (i) device types of the devices in the group, and (ii) the context data provided by the robot; and managing, by the one or more computers, the multiple devices in the group so that only the robot outputs a response to the one of the two or more different voice inputs that overlap in time.

2. The method of claim 1, further comprising identifying a respective account associated with each of the plurality of devices;

wherein grouping at least some of the plurality of devices comprises defining the group to include devices that detected the same one of the two or more different voice inputs that overlap in time and that are associated with a same account.

3. The method of claim 1, further comprising determining a location of each of the plurality of devices;

wherein grouping at least some of the plurality of devices comprises defining the group to include devices that each detected the same one of the two or more different voice inputs that overlap in time, that each configured to respond to the one of the two or more different voice inputs that overlap in time, and are determined to each be located at a same location.

4. The method of claim 1, wherein evaluating the audio signatures for the voice inputs and times that the voice inputs were detected comprises:

comparing the audio signatures to identify audio signatures that differ by less than a threshold amount; and comparing times that the voice inputs were detected to identify devices that detected voice inputs that began within threshold amount of time from each other.

5. The method of claim 1, further comprising obtaining a transcription of the respective voice inputs using an automatic speech recognition system;

wherein grouping at least some of the plurality of devices comprises defining the group to include devices that detected the same one of the two or more different voice inputs that overlap in time and that detected voice inputs determined to have transcriptions that are within a threshold level of similarity.

6. The method of claim 1, wherein the one or more computers comprise a server system;

wherein the messages from the devices are received by the server system over a communication network; and wherein the method further comprises:

receiving, by the server system and from the devices, audio data of the voice inputs detected by the devices; and generating, by the server system, the audio signatures based on the received audio data of the voice inputs detected by the devices.

7. The method of claim 1, wherein selecting the device to respond to the one of the two or more different voice inputs that overlap in time from among the multiple devices in the group comprises selecting the device based on levels of speech power in the detected voice inputs for the devices in the group.

8. The method of claim 1, wherein selecting the device to respond to the one of the two or more different voice inputs that overlap in time from among the multiple devices in the group comprises selecting the device based on a pose of a user.

9. The method of claim 1, wherein selecting the device to respond to the one of the two or more different voice inputs that overlap in time from among the multiple devices in the group comprises selecting the device based on a gaze direction of a user.

10. The method of claim 1, wherein selecting the device to respond to the one of the two or more different voice inputs that overlap in time from among the multiple devices in the group comprises selecting the device based on a direction of movement of a user.

11. The method of claim 1, wherein the response to the one of the two or more different voice inputs that overlap in time by the robot includes moving a robotic arm of the robot.

12. A system comprising:

one or more computers; and one or more non-transitory computer-readable media storing instructions that, when executed by the one or more computers, cause the one or more computers to perform operations comprising:

receiving, by the one or more computers, messages from a plurality of devices that have collectively detected two or more different voice inputs that overlap in time, each of the messages indicating a respective voice input of the two or more different voice inputs that was detected by the device that sent the message;

obtaining, by the one or more computers and based on the messages, an audio signature for each of the two or more different voice inputs that overlap in time and that were collectively detected by the plurality of devices;

evaluating, by the one or more computers, the audio signatures for the two or more different voice inputs that overlap in time, and times that the voice inputs were detected;

based on evaluating the audio signatures for the two or more different voice inputs that overlap in time and the times that the voice inputs were detected, grouping, by the one or more computers, at least some of the plurality of devices to form a group of multiple devices that are determined, based on the evaluation of the audio signatures, to have detected a same one of the two or more different voice inputs that overlap in time and that are each configured to respond to one of the two or more different voice inputs;

selecting, by the one or more computers, a device from among the multiple devices in the group based on a direction of travel of a user with respect to the selected device; and managing, by the one or more computers, the multiple devices in the group so that only the selected device outputs a response to the one of the two or more different voice inputs that overlap in time.

13. The system of claim 12, wherein the group of devices comprises a robot; and wherein selecting the device to respond to the one of the two or more different voice inputs that overlap in time comprises selecting the robot to respond to the one of the two or more different voice inputs that overlap in time based on a determination, based on sensor data captured by the robot, that a user is walking toward the robot.

14. The system of claim 12, wherein the selected device is selected further based on context data from a robot that includes indications of engagement of a user with the robot.

15. One or more non-transitory computer-readable media storing instructions that, when executed by one or more computers, cause the one or more computers to perform operations comprising:
   receiving, by the one or more computers, messages from a plurality of devices that have collectively detected two or more different voice inputs that overlap in time, each of the messages indicating a respective voice input of the two or more different voice inputs that was detected by the device that sent the message;
   obtaining, by the one or more computers and based on the messages, an audio signature for each of the two or more different voice inputs that overlap in time and that were collectively detected by the plurality of devices;
   evaluating, by the one or more computers, the audio signatures for the two or more different voice inputs that overlap in time, and times that the voice inputs were detected;
   based on evaluating the audio signatures for the two or more different voice inputs that overlap in time and the times that the voice inputs were detected, grouping, by the one or more computers, at least some of the plurality of devices to form a group of multiple devices that are determined, based on the evaluation of the audio signatures, to have detected a same one of the two or more different voice inputs that overlap in time and that are each configured to respond to one of the two or more different voice inputs, wherein the multiple devices in the group are each determined to be located in a same location;
   receiving, by the one or more computers, data indicating a request from a particular device in the group, sent by the particular device after the one of the two or more different voice inputs was detected, for the particular device to respond to the one of the two or more different voice inputs;
   selecting, by the one or more computers, the particular device to respond to the one of the voice inputs based on the request; and
   managing, by the one or more computers, the multiple devices in the group so that only the particular device outputs a response to the one of the two or more different voice inputs that overlap in time, comprising (i) allowing the particular device to respond to the one of the two or more different voice inputs that overlap in time and (ii) sending, to each of the other devices in the group, a command suppressing response to the one of the two or more different voice inputs that overlap in time by the other devices.

16. The one or more non-transitory computer-readable media of claim 15, wherein the one or more computers are configured to perform a selection process to select, from among the group, a device to respond based on device types of the devices in the group; and
   wherein selecting the particular device to respond to the one of the two or more different voice inputs that overlap in time based on the request comprises overriding the selection process based on the request from the particular device.

17. The one or more non-transitory computer-readable media of claim 15, wherein the group of multiple device comprises a robot;
   wherein the particular device sending the request to respond to the one of the two or more different voice inputs that overlap in time is the robot; and
   wherein the robot begins to output a response to the one of the two or more different voice inputs that overlap in time before the one or more computers select the particular device to respond to the one of the two or more different voice inputs that overlap in time.

18. The one or more non-transitory computer-readable media of claim 17, wherein the response of the robot to the one of the two or more different voice inputs that overlap in time includes a movement of the robot.

19. The one or more non-transitory computer-readable media of claim 17, wherein the robot sends the request based on one or more indications of engagement of a user with the robot that are detected using sensor data captured by the robot, and wherein the request claims an exclusive response to the one of the two or more different voice inputs that overlap in time.

* * * * *